(12) United States Patent
Kang (10) Patent No.: US 8,756,463 B2
(45) Date of Patent: Jun. 17, 2014

(54) METHOD AND APPARATUS FOR DATA MANAGEMENT THROUGH TIMER COMPENSATION IN A WIRELESS COMMUNICATION SYSTEM

(75) Inventor: Dong-Jun Kang, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 215 days.

(21) Appl. No.: 13/378,988

(22) PCT Filed: Jun. 16, 2010

(86) PCT No.: PCT/KR2010/003868
§ 371 (c)(1),
(2), (4) Date: Dec. 16, 2011

(87) PCT Pub. No.: WO2010/147382
PCT Pub. Date: Dec. 23, 2010

(65) Prior Publication Data
US 2012/0089892 A1  Apr. 12, 2012

(30) Foreign Application Priority Data
Jun. 16, 2009  (KR) .................. 10-2009-0053479

(51) Int. Cl.
| G01R 31/28 | (2006.01) |
| H04L 1/18 | (2006.01) |
| H03M 13/00 | (2006.01) |
| H04L 12/26 | (2006.01) |
| H04W 24/00 | (2009.01) |
| G08B 1/00 | (2006.01) |
| H04L 29/06 | (2006.01) |
| H04L 12/56 | (2006.01) |
| G06F 1/32 | (2006.01) |
| H04W 76/04 | (2009.01) |
| H04W 28/04 | (2009.01) |

(52) U.S. Cl.
CPC ............. *H04L 1/1848* (2013.01); *H04L 1/1851* (2013.01); *H04L 1/1835* (2013.01); *H04L 1/1874* (2013.01); *H04L 1/188* (2013.01); *H04L 1/1883* (2013.01); *H04L 29/06993* (2013.01); *H04L 47/283* (2013.01); *H04L 69/28* (2013.01); *G06F 1/3228* (2013.01); *H04W 76/048* (2013.01); *H04W 28/04* (2013.01)
USPC ........... 714/712; 714/748; 714/749; 714/776; 714/799; 370/241; 370/242; 370/250; 455/8; 455/423; 340/309.16

(58) Field of Classification Search
CPC ... H04L 1/1835; H04L 1/1848; H04L 1/1851; H04L 1/1874; H04L 1/188; H04L 1/1883
USPC .......... 714/712, 748, 749, 776, 799; 370/241, 370/242, 250; 455/8, 423; 340/309.16
See application file for complete search history.

(56) References Cited

U.S. PATENT DOCUMENTS
6,590,905 B1 * 7/2003 Suumaki et al. .............. 370/466
7,646,742 B2 * 1/2010 Petrovic et al. ............... 370/328
(Continued)

FOREIGN PATENT DOCUMENTS
KR  10-2006-0092949  8/2006
WO  WO 2008153477 A1 * 12/2008 ............... H04L 1/18

OTHER PUBLICATIONS
Jo et al., Enhanced Packet Scheduling Algorithm Providing QoS in High Speed Downlink Packet Access, 2006, IEEE, pp. 1-5.*
(Continued)

*Primary Examiner* — John J Tabone, Jr.

(57) ABSTRACT

A method and an apparatus for data management through timer compensation in a wireless communication system are provided. In the method, when a data loss occurs at a first point, whether a data loss has occurred previously and so whether a timer is being driven are determined. Whether the driven timer stops or expires at a second point is determined. When the timer stops or expires at the second point, a timer value is compensated for with consideration of a time difference between the first point and the second point. A timer for the data loss of the first point is restarted based on the compensated timer value. Therefore, a delay of a retransmission request time for lost data in an RLC (Radio Link Control) layer may be minimized.

20 Claims, 5 Drawing Sheets

(56) References Cited

U.S. PATENT DOCUMENTS

| | | | |
|---|---|---|---|
| 7,778,260 B2* | 8/2010 | Sturniolo et al. | 370/401 |
| 7,870,259 B2* | 1/2011 | Meyer et al. | 709/227 |
| 8,233,909 B2* | 7/2012 | Harada et al. | 455/450 |
| 8,385,959 B2* | 2/2013 | Lee et al. | 455/509 |
| 8,463,232 B2* | 6/2013 | Tuli et al. | 455/405 |
| 8,483,109 B2* | 7/2013 | Burbidge et al. | 370/310 |
| 2004/0148546 A1* | 7/2004 | Meyer et al. | 714/18 |
| 2007/0025357 A1* | 2/2007 | Zhang et al. | 370/395.4 |
| 2008/0102841 A1* | 5/2008 | Kato | 455/442 |
| 2009/0168920 A1* | 7/2009 | Chen | 375/295 |
| 2010/0091721 A1* | 4/2010 | Larmo et al. | 370/329 |
| 2010/0135209 A1* | 6/2010 | Harada et al. | 370/328 |
| 2010/0177747 A1* | 7/2010 | Chun et al. | 370/336 |
| 2010/0220709 A1* | 9/2010 | Peisa | 370/345 |
| 2010/0261468 A1* | 10/2010 | Chun et al. | 455/422.1 |
| 2010/0313024 A1* | 12/2010 | Weniger et al. | 713/170 |
| 2012/0287909 A1* | 11/2012 | Ohta et al. | 370/331 |
| 2012/0294151 A1* | 11/2012 | Ohta et al. | 370/236 |
| 2012/0294284 A1* | 11/2012 | Ohta et al. | 370/331 |

OTHER PUBLICATIONS

International Search Report dated Jan. 26, 2011 in connection with International Patent Application No. PCT/KR2010/003868.

Written Opinion of International Searching Authority dated Jan. 26, 2011 in connection with International Patent Application No. PCT/KR2010/003868.

R. Bestak, "Influence of Window Size on MAC-hs performance", Proceedings of International Conference on Systems and Network, Apr. 29, 2006, pp. 29-34.

Yong Li, et al.: "On the Enhancement to Timer-Based Stalling Avoidance Mechanism in HARQ Protocols", Proceedings of IEEE International Conference on Communications, May 23, 2008; pp. 2786-2790.

* cited by examiner

METHOD AND APPARATUS FOR DATA MANAGEMENT THROUGH TIMER COMPENSATION IN A WIRELESS COMMUNICATION SYSTEM

CROSS-REFERENCE TO RELATED APPLICATION(S)

The present application claims priority under 35 U.S.C. §365 to International Patent Application No. PCT/KR2010/003868 filed Jun. 16, 2010, entitled "METHOD AND APPARATUS FOR DATA MANAGEMENT THROUGH TIMER COMPENSATION IN WIRELESS COMMUNICATION SYSTEM". International Patent Application No. PCT/KR2010/003868 claims priority under 35 U.S.C. §365 and/or 35 U.S.C. §119(a) to Korean Patent Application No. 10-2009-0053479 filed Jun. 16, 2009 and which is incorporated herein by reference into the present disclosure as if fully set forth herein.

BACKGROUND OF THE INVENTION

1. Field of the Invention

The present invention relates to a method and an apparatus for data management through timer compensation in a wireless communication system. More particularly, the present invention relates to an apparatus and a method for compensating for a timer in order to minimize delay of a retransmission request for lost data.

2. Description of the Related Art

To guarantee in-sequence delivery of data in a Media Access Control (MAC) layer and a Radio Link Control (RLC) layer, an HSPA+ (HSPA evolution) has a structure in which the MAC layer performs reordering of the received data and then delivers sequential data to the RLC layer. At this point, when data is not received sequentially, the MAC layer buffers received data for in-sequence delivery of the data using a receiver window and a timer T1.

When data are not sequentially received in the MAC layer and the RLC layer, a reception end waits for reception of missing data for a predetermined time using a reordering release timer (referred to as a "timer T1" hereinafter). Data includes a unique Sequence Number (SN) for identifying between data. The SN is used for determining whether data is sequentially received or whether data lost in the midway exist.

The timer T1 controls stall avoidance in a reordering buffer of the reception end. An operating method of the timer T1 may be divided into four kinds as illustrated in FIG. 1A-1D.

Figure 1A:
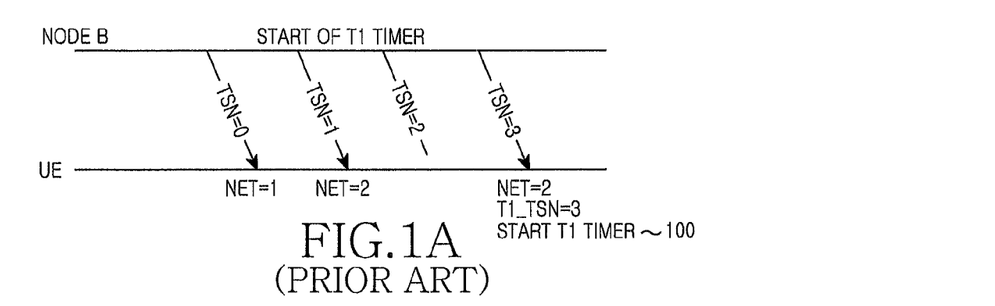
FIG. 1 is an exemplary view illustrating an operation of a timer T1 according to the conventional art.

FIG. 1A illustrates an exemplary start of a timer T1 according to the conventional art.

Referring to FIG. 1A, in the case where a Transmission Sequence Number (TSN) of received data is greater than a Next_Expected_TSN (NET) to be received next, the timer T1 is started when it is not activated, and T1_TSN is set to TSN of the received data. The T1_TSN is an SN of data arranged in order by a receiver window to trigger the timer T1 and not received. For example, when User Equipment (UE) receives data whose TSN is 0 and data whose TSN is 1 from a base station (Node B), a NET value becomes 2. After that, when the UE cannot receive data whose TSN is 2 from the Node B (that is, the data whose TSN is 2 is lost) and receives data whose TSN is 3, the UE compares the TSN of the currently received data with a current NET=2 to recognize that the data whose TSN is 2 has been lost and start the timer T1 (100). When the timer T1 is already activated, the timer T1 is not started and the existing already activated timer T1 is maintained. Since a 3 Generation Partnership Project (3GPP) specification defines that "only one timer T1 should maintain an activated state during a given time", an additional timer is not started.

Figure 1B:
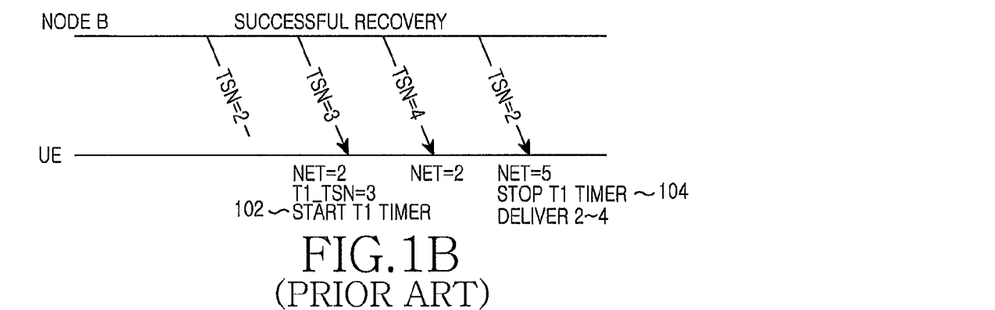

FIG. 1B illustrates an exemplary stop of a Timer T1 according to the conventional art.

Referring to FIG. 1B, when lost data (data whose TSN=2) exists and so the timer T1 starts (102) as in FIG. 1A and then UE receives data whose TSN=3, 4, a NET value maintains 2 and waits for next data. After that, when the UE receives data whose TSN=2 before the timer T1 expires, the UE stops the timer T1 and transmits data whose TSN is 2 to 4 to an upper layer (104). At this point, a NET value is updated as 5 and the UE waits for reception of data whose TSN=5. That is, when receiving lost data, the UE stops the activated timer T1.

Figure 1C:
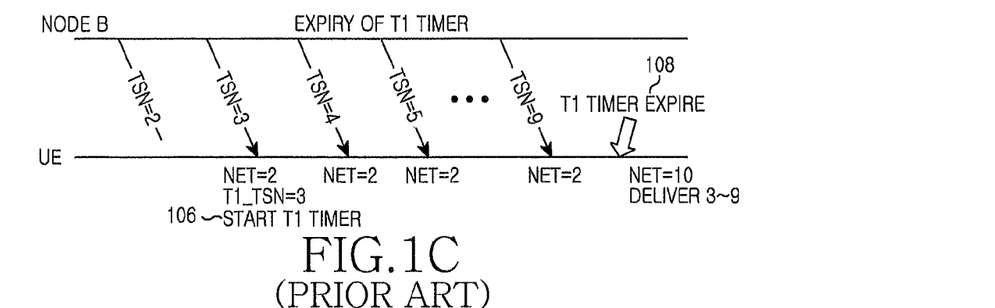

FIG. 1C illustrates an exemplary expiration of the timer T1 according to the conventional art.

Referring to FIG. 1C, when lost data is not received for a predetermined time after a timer T1 is started (106) due to the lost data, the timer T1 expires (108). At this point, when T1_TSN is greater than NET, UE transmits received data (data whose TSN is 3 to data whose TSN is 9) having a TSN value between T1_TSN=9 and NET=2 to an upper layer. In addition, a NET value is set to a TSN value of data not received yet (for example, since up to data whose TSN is 9 have been received, a NET becomes 10).

Figure 1D:
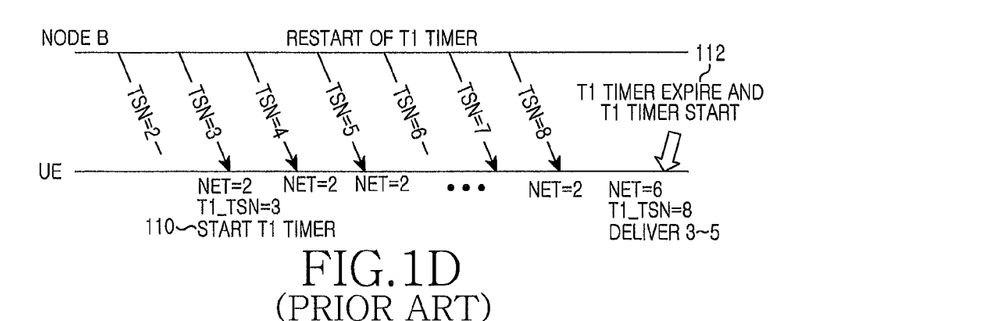

FIG. 1D illustrates an exemplary restart of a timer T1 according to the conventional art.

Referring to FIG. 1D, when the timer T1 is stopped or expires and in-sequence delivery of data to an upper layer is impossible, the timer T1 is restarted and T1_TSN is set to largest TSN of data which cannot be sequentially delivered.

For example, when data whose TSN=2 transmitted from a Node B is lost and UE receives data whose TSN=3, a NET value becomes 2 and T1_TSN indicating TSN of currently received data becomes 3. At this point, the timer T1 starts (110).

After that, UE receives data whose TSN=4 and TSN=8 (Here, it is assumed that data whose TSN=6 has been lost). At this point, a NET value maintains a TSN value (TSN=2) of lost data.

When the timer T1 stops or expires after the UE receives data whose TSN=8, currently received data (TSN=8) that cannot be sequentially delivered due to other lost data (TSN=6) is stored in a reordering buffer, so that the timer T1 is restarted with respect to TSN=6 (112). At this point, for the UE to expect retransmission of the lost data (TSN=6), a NET value is set to 6 and T1_TSN is set to 8. In addition, only data whose TSN=3 to TSN=5 are delivered to an upper layer.

As described above, the MAC layer of the HSPA+ starts/stops/expires/restarts the timer T1 using an SN of data in order to sequentially deliver packet data. At this point, for a T1 timer value, a value received from the upper layer is used.

Therefore, referring to the T1 timer restart procedure of FIG. 1D, when data whose TSN=2 is not received and data whose TSN=3 is received, the timer T1 starts. At this point, the timer T1 is set to a T1 timer value (for example, 100 ms) received from the upper layer. After that, when data whose TSN=2 is not received until the timer T1 expires, UE transmits relevant data (TSN=3,4,5) to the upper layer and restarts the timer T1 according to specification. At this point, the timer T1 is set with respect to data whose TSN=6. Even in this case, the timer T1 is set to a T1 timer value (for example, 100 ms) with respect to data whose TSN=2. That is, the T1 timer value should be applied and operated from a point where data whose TSN=6 has been lost but a timer T1 waits until a timer T1 that has been applied from a point where data whose TSN=2 has been lost expires, and then the timer T1 for the data whose TSN=6 operates, so that a retransmission request for the data whose TSN=6 is delayed.

Therefore, a method and an apparatus for reducing a delay in a retransmission request for other lost data at a point of starting a timer T1 after stoppage or expiration of the timer T1 in a wireless communication system are required.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for data management in a wireless communication system.

Another aspect of the present invention is to provide a method and an apparatus for compensating for a timer value when restarting a timer T1 in a wireless communication system.

Still another aspect of the present invention is to provide a method and an apparatus for minimizing a delay of a retransmission request for lost data when restarting a timer T1 in a wireless communication system.

In accordance with an aspect of the present invention, a method for restarting a timer, for data management in a wireless communication system is provided. The method includes: when a data loss occurs at a first point, determining whether a data loss has occurred previously and a timer is being driven, determining whether the driven timer stops or expires at a second point, when the timer stops or expires at the second point, compensating for a timer value with consideration of a time difference between the first point and the second point, and restarting a timer for the data loss of the first point based on the compensated timer value.

In accordance with another aspect of the present invention, a method for data management in a wireless communication system is provided. The method includes receiving data from an upper node, determining a transmission sequence number of the received data to determine whether data is lost at a first point, when the data loss occurs, and when a data loss has occurred previously and a time is being driven, maintaining a transmission sequence number of the already lost data and determining whether the driven timer stops or expires at a second point, and when the timer stops or expires at the second point, maintaining a transmission sequence number of the data lost at the first point and compensating for a time between the first point and the second point to restart a timer for the data loss of the first point.

In accordance with still another aspect of the present invention, an apparatus for restarting a timer, for data management in a wireless communication system is provided. The apparatus includes a controller for, when a data loss occurs at a first point, determining whether a data loss has occurred previously and a timer is being driven, determining whether the driven timer stops or expires at a second point, and when the timer stops or expires at the second point, compensating for a timer value with consideration of a time difference between the first point and the second point, and a timer manager for restarting a timer for the data loss of the first point based on the compensated timer value.

In accordance with yet another aspect of the present invention, an apparatus for data management in a wireless communication system is provided. The apparatus includes a receiver for receiving data from an upper node, an HARQ controller for determining a transmission sequence number of the received data to determine whether data is lost at a first point, a controller for, when the data loss occurs, and when a data loss has occurred previously and a time is being driven, maintaining a transmission sequence number of the already lost data and determining whether the driven timer stops or expires at a second point, and when the timer stops or expires at the second point, maintaining a transmission sequence number of the data lost at the first point, and a timer manager for compensating for a time between the first point and the second point to restart a timer for the data loss of the first point.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a method and an apparatus for minimizing a delay of a retransmission request time for lost data when restarting a timer (referred to as a "timer T1" hereinafter) that supports in-sequence delivery of data in a wireless communication system.

Though the present invention is described using an HSPA+ (HSPA evolution) system as an example, it is readily applicable to an Institute of Electrical and Electronics Engineers (IEEE) 802.16 system and a Long Term Evolution (LTE) system. Here, the timer T1 value is not a value arbitrarily set by UE but is information configured at a Node B.

In addition, the present invention is applied to a system that conforms to a 3GPP specification that defines that "only one timer T1 should maintain an activated state for a given time".

Figure 2:
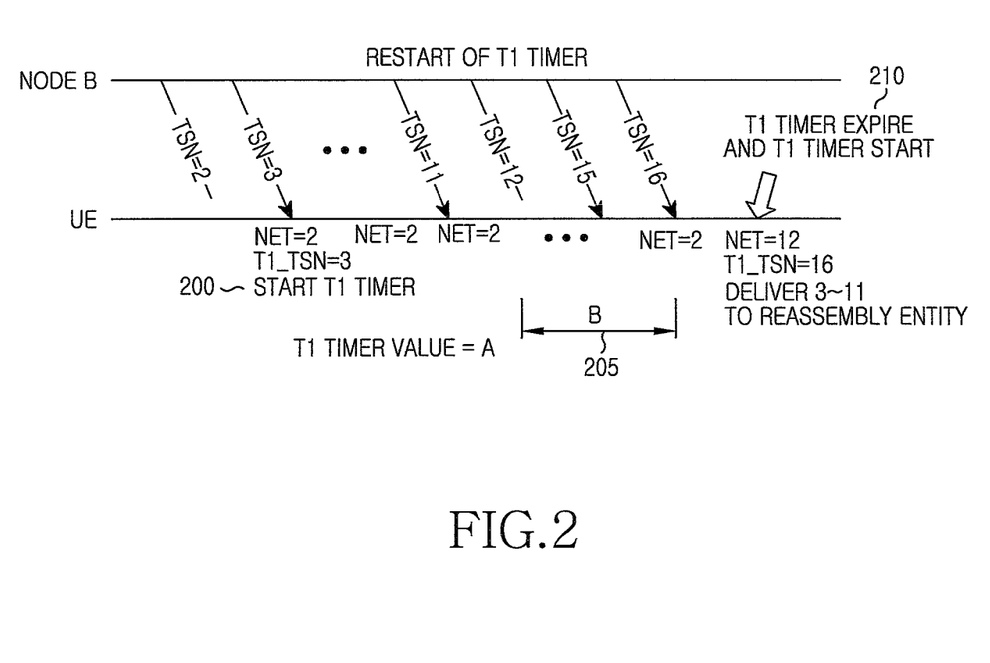
FIG. 2 is an exemplary view of compensating for a timer value when restarting a timer T1 according to an exemplary embodiment of the present invention.

FIG. 2 is an exemplary view of compensating for a timer value when restarting a timer T1 according to an exemplary embodiment of the present invention.

Referring to FIG. 2, when data whose TSN=2 transmitted from a Node B is lost and UE receives data whose TSN=3, the timer T1 starts with a T1 timer value A received in an upper layer (200). At this point, NET=2 indicating TSN of data to be received next is set, and T1_TSN representing a TSN value of currently received data is set to 3.

After that, when UE receives data whose TSN=2 to data whose TSN=16 and data whose TSN=12 is lost, a NET value maintains 2 until the timer T1 expires for a retransmission request of the lost data (TSN=2).

After data whose TSN=16 is received, when the timer T1 activated due to a loss of data whose TSN=2 expires and reception data (for example, lost data whose TSN=12) that is difficult to sequentially deliver to an upper layer exists, UE restarts the timer T1 (210). At this point, when the timer is set, the T1 timer value A received from the upper layer is not used, and to apply an accurate time for which data whose TSN=12 has not been received, a time B (205) from a point where the data whose TSN=12 has been lost to a T1 timer restart point is compensated for, so that the T1 timer restart is set to A-B. Therefore, when a method of the present invention is used, a T1 timer operation time activated due to a loss of data whose TSN=12 may be reduced compared to the conventional art. This may be efficiently used when a channel state is not good under a wireless communication environment. For example, in the case where UE transmits NACK with respect to received data and a Node B erroneously determines ACK, the UE should wait for retransmission data until a timer expires under a circumstance where the Node B does not retransmit the relevant data. In this case, when a T1 timer value is compensated for and used, a faster retransmission request for data not received in an RLC layer may be made, and data that are not transmitted to the RLC layer and are stored in a reordering queue or buffer may be distributed and processed, so that a load that should be processed at a time may be reduced.

Meanwhile, after data whose TSN=16 is received, when the timer T1 activated due to a loss of data whose TSN=2 expires, NET=2 is set and T1_TSN=16 is set. In addition, data whose TSN=3 to data whose TSN=11 are delivered to the upper layer.

Figure 3:
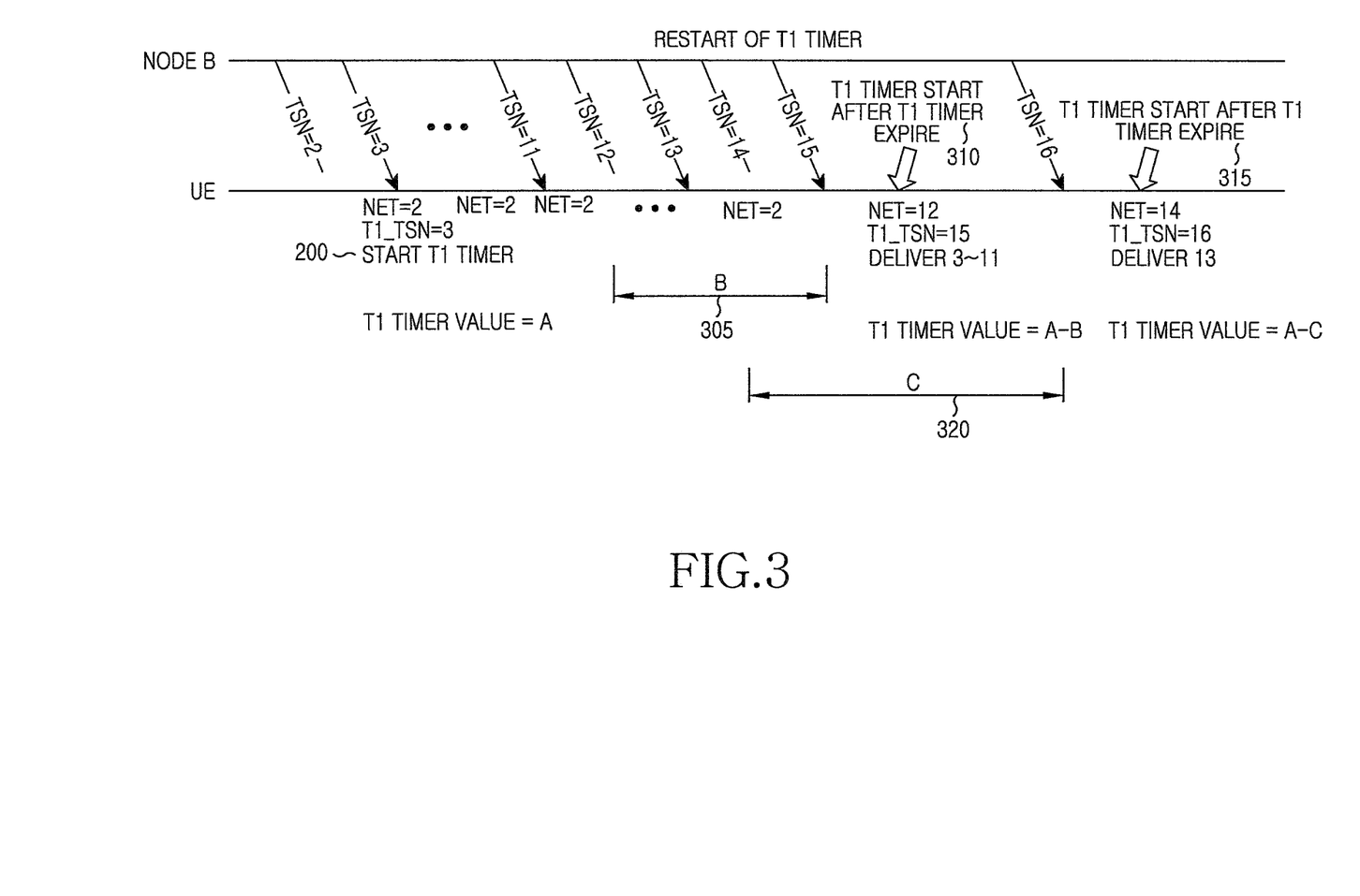
FIG. 3 is an exemplary view of compensating for a timer value when restarting a timer T1 according to an exemplary embodiment of the present invention.

FIG. 3 is an exemplary view of compensating for a timer value when restarting a timer T1 according to an exemplary embodiment of the present invention.

Referring to FIG. 3, when restart is performed after the timer T1 expires as an extension concept of FIG. 2, a T1 timer compensation operation method for the case where TSN of a plurality of not received data exist is described.

When data whose TSN=2 transmitted from a Node B is lost and UE receives data whose TSN=3, the timer T1 is started using a T1 timer value A received from an upper layer (300). At this point, NET=2 is set and T1_TSN representing a TSN value of currently received data is set to 3.

After that, when the UE receives data whose TSN=3 to data whose TSN=15 and data whose TSN=14 is lost, a NET value maintains 2 until the timer T1 expires for a retransmission request for lost data (TSN=2).

After data whose TSN=15 is received, when the timer T1 activated due to a loss of data whose TSN=2 expires and reception data (for example, data whose TSN=12 and data whose TSN=14) that are impossible to sequentially deliver to an upper layer exist, UE restarts the timer T1 for lost data whose TSN=12 (310). At this point, when the timer is set, the T1 timer value A received from the upper layer is not used, and to apply an accurate time for which data whose TSN=12 has not been received, a time B from a point (that is, point of receiving data whose TSN=13 to recognize that data whose TSN=12 is lost) where the data whose TSN=12 has been lost to a T1 timer restart point is compensated for, so that the T1 timer restart is set to A-B (305). At this point, NET=12 is set, T1_TSN=15 is set, and data whose TSN=3 to data whose TSN=11 are delivered to the upper layer.

Likewise, when data (for example, data whose TSN=14) that is impossible to sequentially deliver to the upper layer exists even after a timer T1 for data whose TSN=12 expires, a timer T1 for the data whose TSN=14 is restarted (315). At this point, when a timer value is set for T1 timer restart, a time C from a point (that is, a point of receiving data whose TSN=15 to recognize that the data whose TSN=14 has been lost) where the data whose TSN=14 has been lost to a T1 timer restart point is compensated for, so that a T1 timer restart is set to A-C (320). At this point, NET=14 is set, T1_TSN=16 is set, and data whose TSN=13 is delivered to the upper layer.

Figure 4:
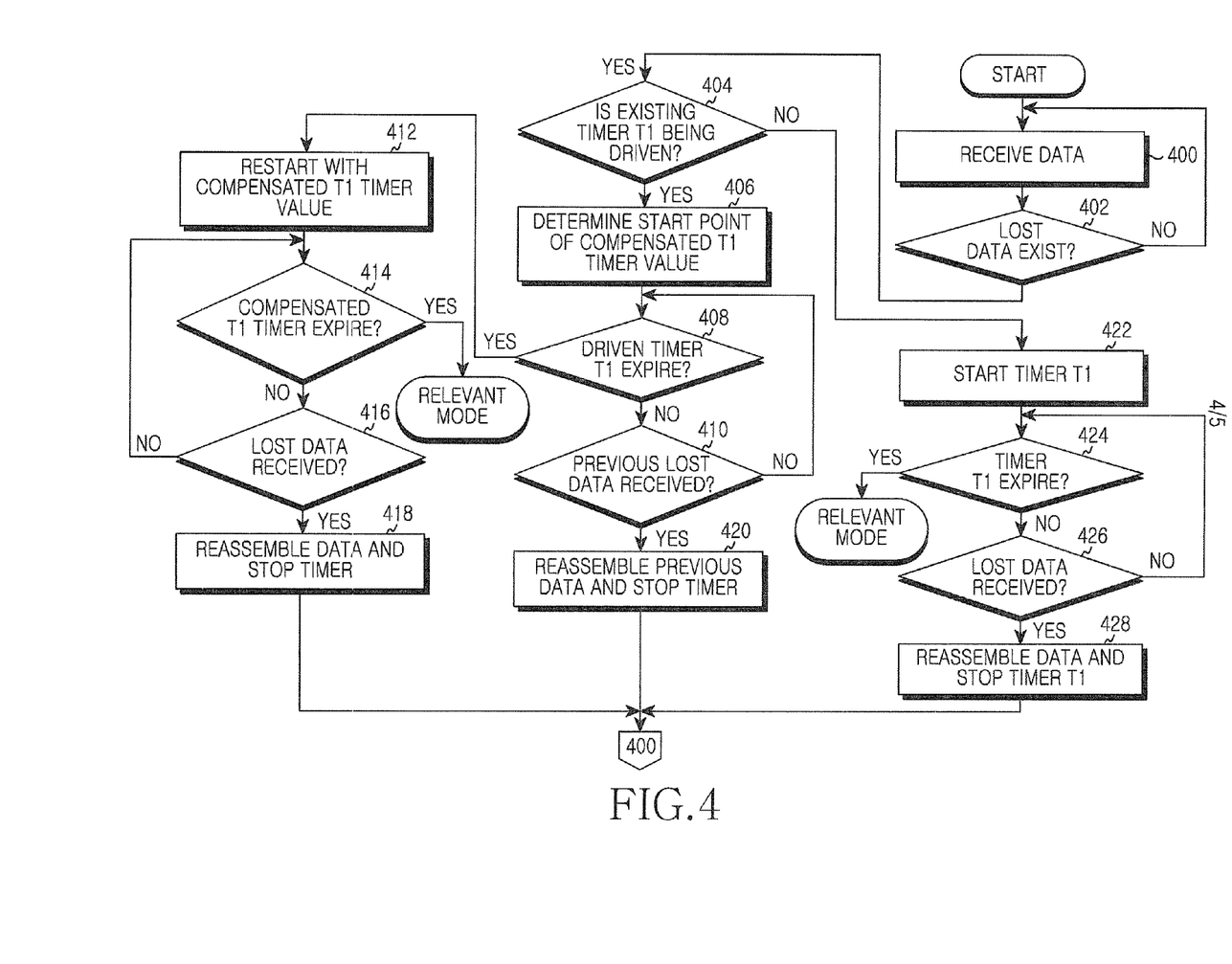
FIG. 4 is a flowchart illustrating an operation of a timer T1 for data management when data is received in a wireless communication system according to an exemplary embodiment of the present invention.

FIG. 4 is a flowchart illustrating an operation of a timer T1 for data management when data is received in a wireless communication system according to an exemplary embodiment of the present invention.

Referring to FIG. 4, UE receives data from a Node B in step 400, and determines whether lost data exists in step 402. The data has a unique sequence number (SN). Therefore, the UE may determine whether data have been sequentially received and whether data lost in the midway exists using the SN.

When the lost data does not exist in step 402, the UE proceeds to step 400 to receive next data. In contrast, when the lost data exists in step 402, the UE proceeds to step 404 to determine whether a timer T1 is already being driven due to the existing data loss.

When the existing driven timer T1 does not exist in step 404, the UE proceeds to step 422 to start a timer T1 for a current data loss, and when the timer T1 expires in step 424, the UE proceeds to a relevant mode. In the relevant mode, the UE abandons retransmission of lost data and continues to receive data. When the timer T1 started in step 422 does not expire in step 424, the UE proceeds to step 426 to determine whether lost data has been retransmitted. The UE waits for reception of lost data until the timer T1 expires in step 426. In contrast, when receiving lost data in step 426, the UE proceeds to step 428 to deliver the received lost data to an upper layer and stops the timer T1 started in step 422.

When the existing driven timer T1 exists in step 404 (that is, previously lost data exists and so the timer T1 is being driven), the UE proceeds to step 406 to determine a start point of a current data loss. For example, when a data loss occurs at a current point (assumed as a point A) while the timer T1 is already being driven, the UE determines the point A.

The UE determines whether the previously driven timer T1 stops or expires in step 408. When the previously driven timer T1 does not stop or expire in step 408, the UE proceeds to step 410 to determine whether previously lost data is received. When the previously lost data is received, the UE proceeds to step 420 to stop the previously driven timer T1 and delivers the previous data to an upper layer.

In contrast, when the previously driven timer T1 expires in step 408, the UE proceeds to step 412 to restart a timer for currently lost data using a compensated T1 timer value based on a time from a T1 timer start point determined in step 406 to a point where a previously driven timer T1 expires in step 408.

In other words, since a timer T1 for lost data at a current point (assumed as A) should be driven but the UE should wait until the previously driven timer T1 stops or expires and then restart a timer T1, the UE compensates for a time from the point A to a point where the previously driven timer T1 stops or expires to restart the timer T1.

The UE determines whether the compensated timer T1 expires in step 414. When the compensated timer T1 does not expire in step 414, the UE proceeds to step 416 to determine whether currently lost data is received. When the currently lost data is received, the UE proceeds to step 418 to stop the compensated timer T1 and delivers the data to the upper layer.

When the compensated timer T1 expires in step 414, the UE proceeds to a relevant mode. The relevant mode abandons retransmission of the lost data.

Figure 5:
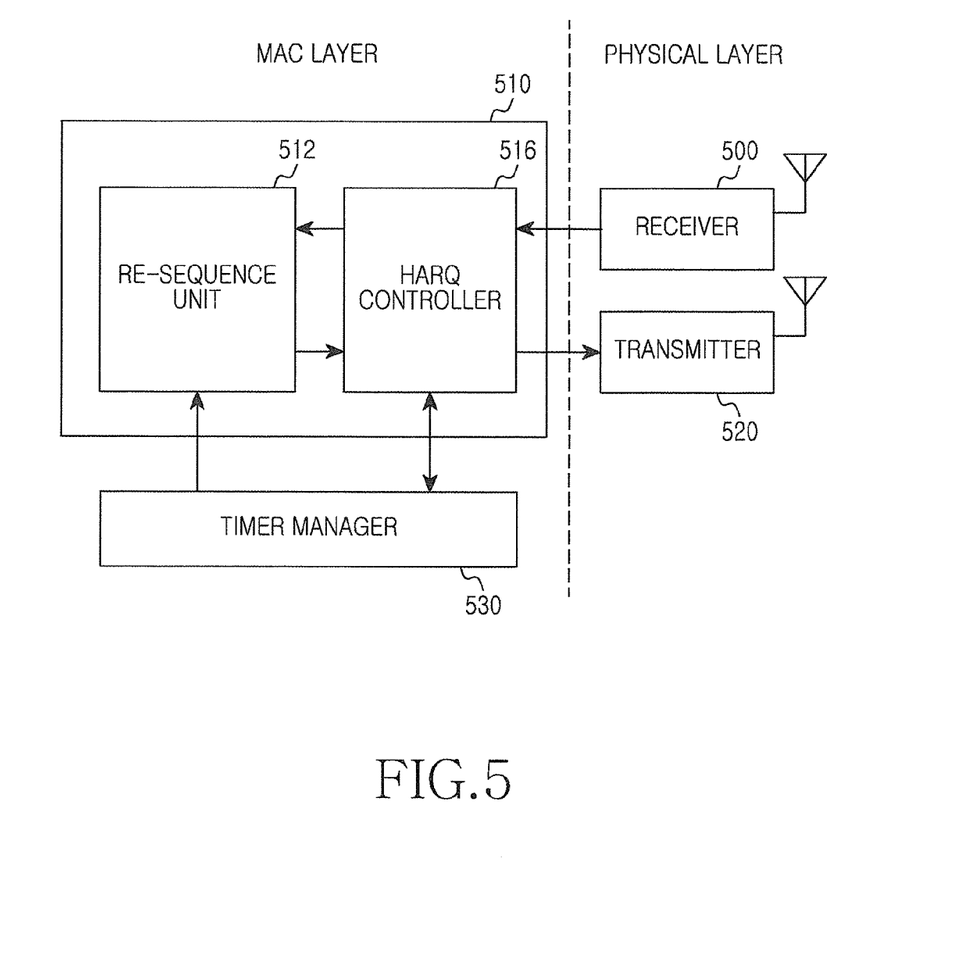
FIG. 5 is a block diagram for data management when data is received in a wireless communication system according to an exemplary embodiment of the present invention.

FIG. 5 is a block diagram for data management when data is received in a wireless communication system according to an exemplary embodiment of the present invention.

Referring to FIG. 5, the terminal includes a receiver 500, a controller 510, a timer manager 530, and a transmitter 520.

The receiver 500 converts a Radio Frequency (RF) signal received from a Node B into a baseband analog signal, converts the baseband analog signal to digital sample data, and performs Orthogonal Frequency Division Multiplexing (OFDM) demodulation on the sample data to output data values of a subcarrier to the controller 510. Here, the OFDM demodulation includes Cyclic Prefix (CP) cancellation, Fast Fourier Transform (FFT), etc.

The transmitter 520 receives a control signal or data from the controller 510 to perform OFDM modulation on the signal, and converts the modulated signal into an RF signal to output the same via an antenna. The OFDM modulation includes Inverse FFT (IFFT) performing Inverse Fast Four Transform to output data in a time domain, CP addition, etc.

The controller 510 controls an overall operation of the terminal, controls a transmission error with respect to data received from the receiver 500, stores received data in a reordering buffer (not shown) to control so that data are sequentially delivered. The reordering buffer may be a separate external memory or a queue inside the controller 510. The controller 510 includes a re-sequence unit 512 and an HARQ controller 516 for transmission error control and in-sequence data delivery.

When an error occurs in received data, the HARQ controller 516 tries error correction or requests retransmission according to an HARQ technique. The HARQ technique basically tries error correction for a received code and determines whether to retransmit data using a simple error detection code such as a Cyclic Redundancy Check (CRC). In addition, the HARQ technique provides a result that an error occurs to received data to the timer manager 530.

The re-sequence unit 512 reorders data stored in a reordering buffer via a transmission error control from the HARQ controller 516 according to start/stop/expire/restart of a timer T1 of the timer manager 530 and transmits the data to an upper layer at a relevant point. That is, the re-sequence unit 512 guarantees in-sequence delivery to the upper layer by performing reordering depending on TSN of each data.

The timer manager 530 manages start/stop/expire/restart of a timer T1 based on a transmission error control from the controller 510. For example, the timer manager 530 receives whether lost data occurs to start a timer T1 for a retransmission request (refer to FIG. 1A). In addition, when lost data exists and so the timer T1 starts and then the lost data is received before the timer T1 expires, the timer manager 530 stops the timer T1 (refer to FIG. 1B). In addition, as illustrated in FIG. 1C, when the lost data is not received for a predetermined time after the timer T1 is started due to the lost data, the timer T1 expires.

In addition, as in FIGS. 2 and 3, when data for which an in-sequence delivery to the upper layer is impossible exists after the timer T1 stops or expires, the timer T1 is restarted. At this point, when a timer value for restarting a timer T1 is set, a T1 timer value received from the upper layer is not used but a compensated timer value is used.

Though the present invention has been described using downlink data transmission as an example, the present invention is applicable to uplink data transmission. that is, to the case where a terminal transmits data to a base station.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

As described above, a wireless communication system may minimize a delay of a retransmission request time for lost data in an RLC layer by compensating for a timer value when restarting a timer T1. In addition, the same retransmission request time for lost data is applied, so that a data management method may be improved in an aspect of load balancing.

What is claimed is:

1. A method for restarting a timer, for data management in a wireless communication system, the method comprising:
   in response to a data loss occurring at a first point, determining whether a timer is being driven for a previous data loss;
   in response to determining that the timer for the previous data loss stops or expires at a second point, compensating for a time difference between the first point and a second point in a timer value for the data loss occurring at the first point; and
   restarting the timer for the data loss occurring at the first point based on the compensated timer value.

2. The method of claim 1, wherein the timer for the data loss occurring at the first point comprises a timer for supporting an in-sequence delivery of data.

3. The method of claim 1, wherein the wireless communication system maintains only one timer at an activated state for a given time in order to support an in-sequence delivery of data.

4. The method of claim 1, wherein the timer value comprises information configured in an upper node.

5. The method of claim 1, wherein when the timer is not being driven for any previous data loss, the timer for the data loss occurring at the first point is started at the first point.

6. The method of claim 1, wherein when the timer for the data loss occurring at the first point is started, Next_Expected_TSN (NET) is set to a Sequence Number (SN) of the data loss, and Transmission Sequence Number (T1_TSN) is set to an SN of last data of data received up to a present time, and
   wherein data ordered up to a present time are delivered to an upper layer.

7. The method of claim 1, wherein while the timer is being driven, the timer stops when data for the data loss is received.

8. An apparatus for restarting a timer, for data management in a wireless communication system, the apparatus comprising:
   a controller configured to, in response to a data loss occurring at a first point, determine whether a timer is being driven for a previous data loss; and in response to determining that the timer for the previous data loss stops or expires at a second point, compensate for a time difference between the first point and the second point in a timer value for the data loss occurring at the first point; and a timer manager configured to restart the timer for the data loss occurring at the first point based on the compensated timer value.

9. The apparatus of claim 8, wherein the timer for the data loss occurring at the first point comprises a timer configured to support an in-sequence delivery of data.

10. The apparatus of claim 8, wherein the wireless communication system maintains only one timer at an activated state for a given time in order to support an in-sequence delivery of data.

11. The apparatus of claim 8, wherein the timer value comprises information configured in an upper node.

12. The apparatus of claim 8, wherein when the timer is not being driven for any previous data loss, the timer for the data loss occurring at the first point is started at the first point without compensation.

13. The apparatus of claim 8, wherein when the timer for the data loss occurring at the first point is started, Next_Expected_TSN (NET) is set to a Sequence Number (SN) of the data loss, and Transmission Sequence Number(T1_TSN) is set to an SN of last data of data received up to a present time, and wherein data ordered up to a present time are delivered to an upper layer.

14. The apparatus of claim 8, wherein while the timer is being driven, the timer stops when data for the data loss is received.

15. A wireless communication system for data management comprising at least one terminal configured to restart a timer, the terminal comprising:

a controller configured to, in response to a data loss occurring at a first point, determine whether a timer is being driven for a previous data loss; and in response to determining that the timer for the previous data loss stops or expires at a second point, compensate for a time difference between the first point and the second point in a timer value for the data loss occurring at the first point; and a timer manager configured to restart a timer for the data loss of the first point based on the compensated timer value.

16. The system of claim 15, wherein the timer for the data loss occurring at the first point comprises a timer configured to support an in-sequence delivery of data.

17. The system of claim 15, wherein the wireless communication system maintains only one timer at an activated state for a given time in order to support an in-sequence delivery of data.

18. The system of claim 15, wherein the timer value comprises information configured in an upper node.

19. The system of claim 15, wherein when the timer is not being driven for any previous data loss, the timer for the data loss occurring at the first point is started at the first point without compensation.

20. The system of claim 15, wherein when the timer for the data loss occurring at the first point is started, Next_Expected_TSN (NET) is set to a Sequence Number (SN) of the data loss, and Transmission Sequence Number (T1_TSN) is set to an SN of last data of data received up to a present time, and wherein data ordered up to a present time are delivered to an upper layer.

\* \* \* \* \*